United States Patent
Yim et al.

(12) 
(10) Patent No.: US 8,634,714 B2
(45) Date of Patent: Jan. 21, 2014

(54) METHODS FOR DETERMINING ENERGY EFFICIENT OPTICAL ROUTES

(75) Inventors: Raymond Yim, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 324 days.

(21) Appl. No.: 12/984,977

(22) Filed: Jan. 5, 2011

(65) Prior Publication Data

US 2012/0170934 A1 Jul. 5, 2012

(51) Int. Cl.
*H04L 12/00* (2006.01)
*H04L 12/56* (2011.01)

(52) U.S. Cl.
CPC .................................. *H04L 49/357* (2013.01)
USPC .......................................................... 398/57

(58) Field of Classification Search
USPC ............................................................ 398/57
See application file for complete search history.

(56) References Cited

U.S. PATENT DOCUMENTS

2007/0201871 A1* 8/2007 Peddanarappagari et al. .. 398/57
2011/0129222 A1* 6/2011 Karol .............................. 398/58

* cited by examiner

*Primary Examiner* — Danny Leung
(74) *Attorney, Agent, or Firm* — Dirk Brinkman; Gene Vinokur

(57) ABSTRACT

An optical network includes multiple source, cross connect, and destination nodes. A traffic demand matrix is constructed for each possible pair of combinations of the source nodes and the destination nodes. A first energy reduction metric is determined for creating the bypass between the source node and any XC node based on the traffic demand matrix, and a second energy reduction metric is determined for creating the bypass between any XC node and the destination node using the traffic demand matrix. Then, a bypass that terminates at one of the XC nodes that has a largest energy reduction metric is created.

10 Claims, 9 Drawing Sheets

Assume no other traffic and disjoint paths from A→B and A→C, compare two scenarios:
(1) No Bypass
(2) Bypass to B, then route to C    301

Option (1):
Switching Energy = $2(H_{AB}E_s(R_B) + H_{AC}E_s(R_C))$
Transmission Energy = $\tau(D_{AB}R_B + D_{AC}R_C)$
Capacity = $H_{AB}R_B + H_{AC}R_C$    302

Option (2):
Switching Energy = $2(E_s(R_B+R_C) + H_{BC}E_s(R_C))$
Transmission Energy = $\tau(D_{AB}(R_B+R_C) + D_{BC}R_C)$
Capacity = $H_{AB}(R_B+R_C) + H_{BC}R_C$    303

Graph Constraint:
minimum Hop: $H_{AB} + H_{BC} \geq H_{AC} \geq H_{AB} - H_{BC}$    304

*Fig. 3B*

METHODS FOR DETERMINING ENERGY EFFICIENT OPTICAL ROUTES

FIELD OF THE INVENTION

This invention relates generally to optical networks, and more particular to determining energy efficient routes in optical networks and creating optical bypasses in the optical network.

BACKGROUND OF THE INVENTION

Energy consumption in the telecommunication industry has direct impact on the total energy consumption of the world. For example, in 2005, the Telecom Italia network consumed over 2 TWh, which is about 1% of all Italian energy consumption. Energy consumption also implies the generation of $CO_2$ gas, e.g., 2 TWh is equivalent to 4,000,000 ton of $CO_2$ emission. Therefore, it is therefore important to reduce energy consumption of telecom networks.

Next generation Optical Transport Network (OTN) frames transport data using Optical Data Units (ODUs). Different level of the ODUs can carry traffic at different data rate. Specifically, ODU0 carries 1.25 Gbps, ODU1 carries 2.5 Gbps, ODU2 carries 10 Gbps, ODU3 carries 40 Gbps, and ODU4 carries 100 Gbps (all values are nominal).

It is known that the processing of larger ODUs at a cross connect (XC) consumes half the energy per bit than smaller ODUs. Consequently, an optical path with large amount of data consumes less energy per bit than paths with smaller ODUs.

Each optical fiber can carry optical data traffic over multiple wavelengths. A typical core optical network can have line rates of 10, 40 or 100 Gbps. This means that each wavelength can carry information at 10, 40 or 100 Gbps. For example, if a wavelength has 100 Gbps, the fiber can be used to carry a single ODU4, or 4 ODU3, or any other combinations of ODU of different levels. When the wavelength carries more than one ODU, the optical signal is converted to electrical signal at the XC. Data of each ODU are processed at the XC, and then converted back to the optical domain before transmitted by a corresponding output port.

When the wavelength carries only a single ODU, and the data are routed to the same wavelength at an output port of the XC, an optical bypass can be used. An optical bypass does not require optical-to-electrical (O2E) and electrical-to-optical (E2O) conversion, (herein after "conversions"), thus the bypass consumes substantially less energy than any other switching scheme requiring conversion.

SUMMARY OF THE INVENTION

Embodiments of the invention provide a method for determining an energy efficient route in an optical network that take advantage of optical bypasses and processing of large Optical Data Units (ODUs).

The embodiments reduce energy consumption and can be used to determine optimal locations to create the optical bypasses in a large optical network.

After all optical bypasses have been created, the embodiments determine optical routes that reduces energy consumption by favoring large ODUs.

The embodiments also provide signaling requirement to determine the energy efficient routes.

BRIEF DESCRIPTION OF THE DRAWINGS

FIG. 3B is a schematic of assumptions, options and a graph constraint for the network of FIG. 3A;

DETAILED DESCRIPTION OF THE PREFERRED EMBODIMENT

Figure 1:
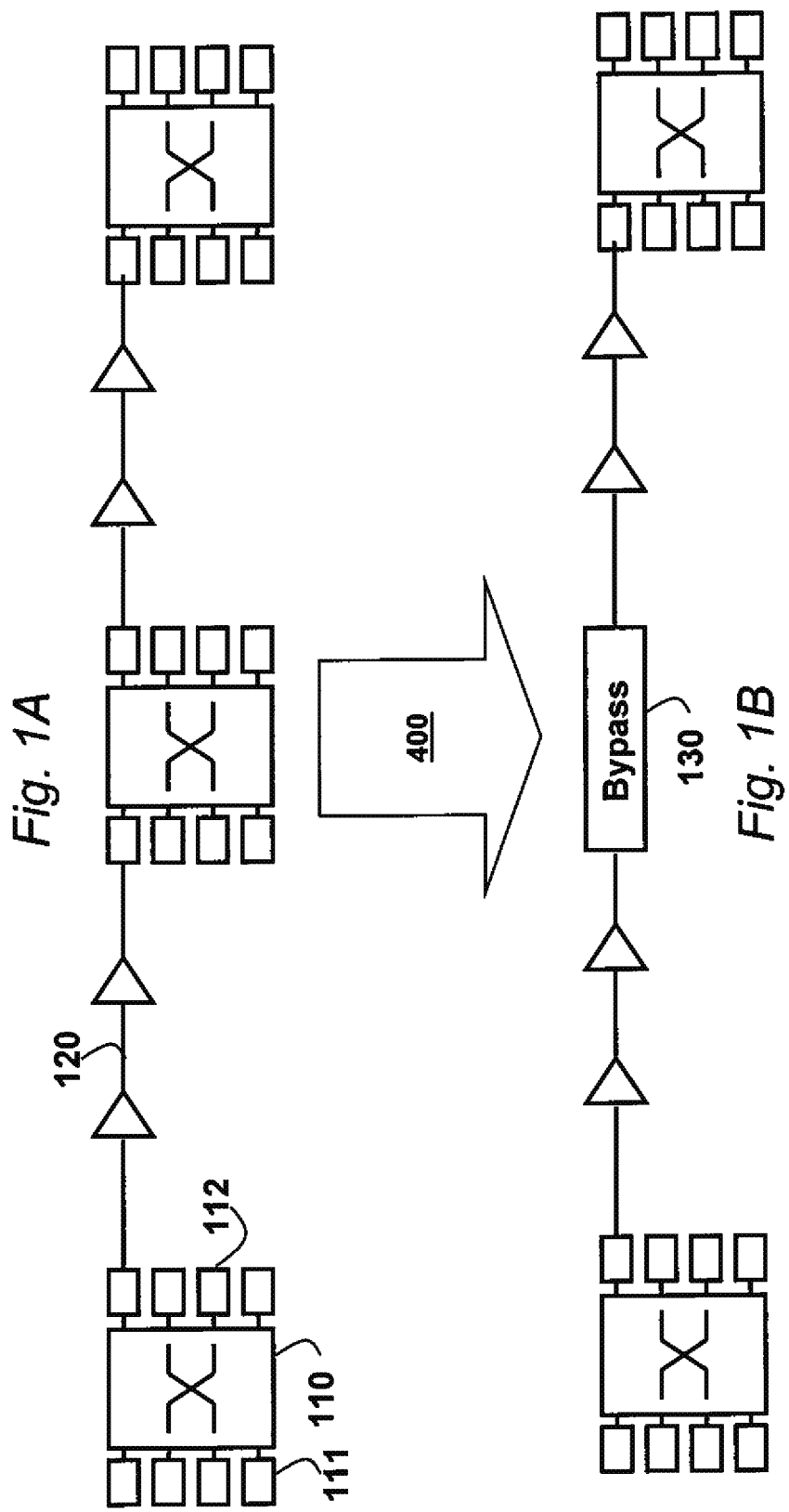
FIG. 1A is a block diagram of a optical network in which a bypass is to be created according to a method according to embodiments of the invention.
FIG. 1B is a block diagram of the optical network with the optical bypass created by the method according to embodiments of the invention.

FIG. 1A shows a portion of an optical network without an optical bypass. It is desired to create a bypass in the network according to a method 400 according to embodiments of our invention. The optical network typically includes cross multiple connects (XCs) 110, and fiber links 120. Each XC has input ports 111 to receive data, and output ports 112 to transmit data sent. Depending on a size of an optical data unit (ODU), the energy consumption at the receiver at the input port is different than at the transmitter at the output port.

While the invention applies to network with a set of multiple source nodes and a set of multiple destination nodes, for simplicity the motivation for energy saving is described for a single source and single destination.

For simplicity of this description, it is assumed that the switching energy consumption of a specific link and XC at both the input ports and the output ports is $E_S$. During transmission over the link, a number of optical repeaters exist so that the energy consumption over the transmission link is proportional to transmission energy $E_T$. This energy consumption depends on the distance of the link. For example, in a network with three XCs and two fiber links, the total the energy consumed is $4E_S+DE_T$, where D is the distance of the total distance of the fiber links.

As shown in FIG. 1B, if a large amount of traffic is transmitted, so that the traffic uses the entire wavelength, then it is possible to use an optical bypass 130 instead of the middle XC in FIG. 1A. This way, no conversions between optical and electrical signals is required at the bypass. Rather, the entire wavelength is bypassed directly from the input port to the output port. The total energy consumption is now $2E_S+DE_T$.

In general, the energy consumption at the XC increases as the line data rate R increases. However, the marginal energy consumption for processing a bit of information decreases as the data rate increases, due to the use of larger ODUs. Hence, the switching energy consumption $E_S$, as a function of the data rate R, is a concave function with diminishing slope, see FIG. 5. Clearly, every link has a maximum capacity.

The transmission energy consumption $E_s$ in the fiber link comes from amplification, which is approximately constant regardless of the amount of transmitted data over the link. Furthermore, because the link can partition transmission resource over multiple streams of traffic, one can assume that the transmission energy consumption during transmission over fiber is proportional to the data rate R, so that $E_T=\tau R$ and r is a constant. Because switching requires conversion, the switching energy consumption is generally much higher than the transmission energy consumption over the fiber. In other words, $E_S >>> E_T$.

While it is clear that using the bypass can reduce energy consumption, it is not easy to determine the optimal locations for the optical bypasses in a large optical network.

Figure 2:
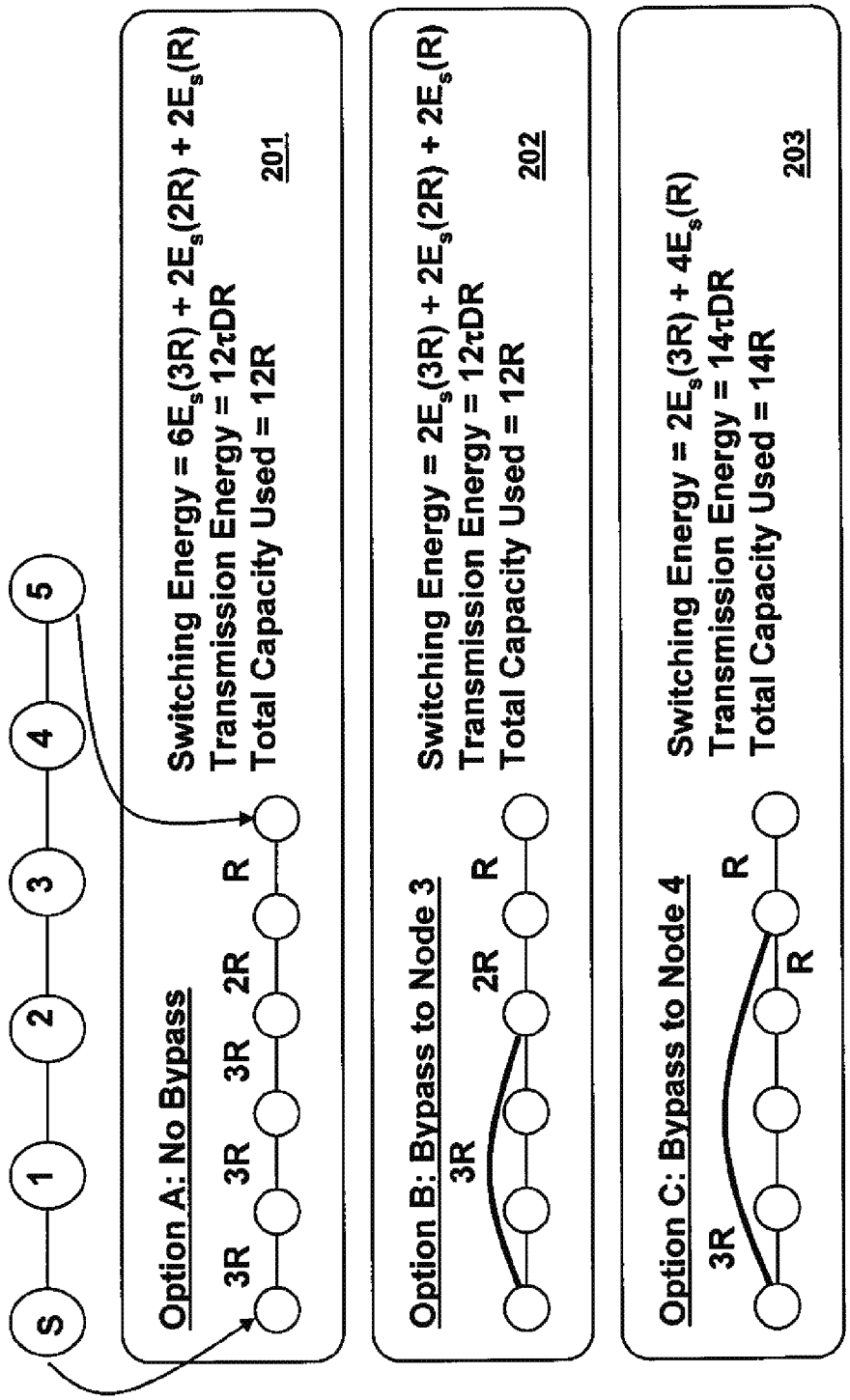
FIG. 2 is a schematic of an optical network with a source, cross connects and bypass options.

As shown in FIG. 2, an optical network includes a single source node (S), and five XC nodes (1-5). The source is required to transmit R amount of data. Each wavelength can carry 3R amount of data.

In Option A 201, no bypass is used. The total switching energy is $6E_S(3R)+2E_S(2R)+2E_S(R)$, the transmission energy is 12τDR, and the capacity is 12R.

In Option B 202, a bypass replaces XCs 1-2. This achieves better performance than Option A. The total switching energy is $2E_S(3R)+2E_S(2R)+2E_S(R)$, the transmission energy is 12τDR, and capacity is 12R.

In Option C 203, the bypass replaces the XCs 1-3. This is an unconventional approach. The total switching energy $2E_S(3R)+4E_S(R)$, The transmission energy is 14τDR, and the capacity is 14R. Because switching energy is much higher than transmission energy, option C consumes the least amount of energy in this example.

While Option C uses the least amount of energy, Option C does consume more network data capacity resource. Network operators always have additional network resource during non-peak hours, and additional resources are also placed to anticipate growth. By changing the routing topology of the optical network, a network operator can reduce energy consumption and operating expenses.

Because the number of XC in a route directly implies the number of conversions when bypasses are not used, it is important to note the minimum hop distance between nodes when energy consumption is considered.

Figure 3A:
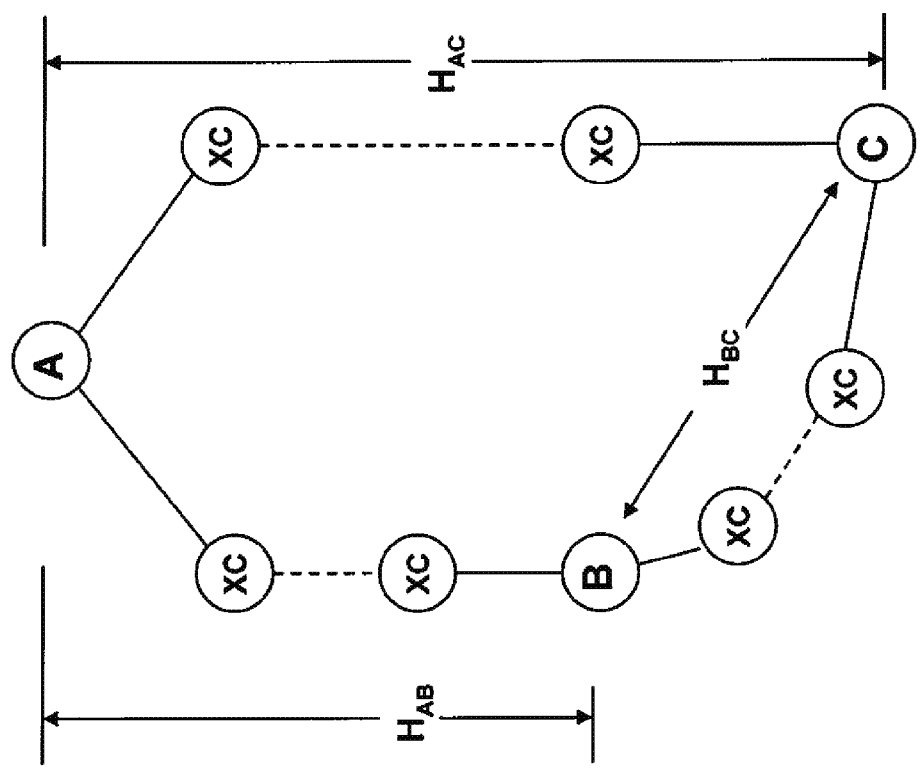
FIG. 3A is a schematic of an optical network with a source node A, XCs nodes, destination nodes B and C and minimum hop distances.

FIG. 3A shows an optical network with a source node A, multiple XC nodes, and destination nodes B and C. The minimum hop distance between nodes A and B is $H_{BC}$, the minimum hop distance between nodes B and C is $H_{BC}$, and the minimum hop distance between nodes A and C is $H_{AC}$.

FIG. 3B shows assumption 301, Option (1) 302, Option (2) 303, and a graph constraint 304 for the network of FIG. 3A. We assume no other traffic, and disjoint paths from A→B and A→C, and compare two options: Option (1) No Bypass, and Option (2) Bypass to B, then route to C. A constraint on the graph is that the minimum Hop: $H_{AB}+H_{BC} \geq H_{AC} \geq H_{AB}-H_{BC}$.

We compare the energy consumption of Option (1) without bypass and Option (2) where a bypass is from the source A to B, and then data are transmitted from B to C through intermediate XCs.

In Option (1), the switching energy consumption is $2(H_{AB}E_S(R_B)+H_{AC}E_S(R_C))$. The transmission energy is $\tau(D_{AB}R_B+D_{AC}R_C)$. The capacity is $H_{AB}R_B+H_{AC}R_C$.

In Option (2), the switching energy consumption is 2(Es $(R_B+RC)+H_{BC}Es(R_C))$. The transmission Energy is $\tau(D_{AB}(R_B+R_C)+D_{BCR}C)$. The capacity is $H_{AB}(R_B+R_C)+H_{BC}R_C$.

Because the transmission energy is small relative to the switching energy, we omit the transmission energy $E_S$ for simplicity of this description. The expression can easily be modified to include the transmission energy. We determine that energy reduction by replacing node B by a bypass according to $$2\sum_C (H_{AC} - H_{BC} - 1)E_s(R_C) + 2(H_{AB} - 1)E_s(R_B) > 0.$$

The first term provides an important insight that energy reduction can be achieved when $H_{BC} \leq H_{AC}-1$. In other words, a minimum hop distance from the bypass to the destination is smaller than a minimum hop distance from the source to the destination.

The second term shows that it is more favorable to create a bypass to a far away node because the bypass node eliminates many conversions along the way.

When a bypass is created between nodes A and B, it means that no O2E and E2O conversions are done at any cross connect node in the link between nodes A and B. E2O conversation is still done at node A, and O2E conversation is still done at node B. In other words, a bypass between nodes A and B does not alter the behavior of the nodes A and B; rather, the bypass alters the behaviors of all cross connect nodes in a link connecting nodes A and B.

Hence, we define a first energy reduction metric for creating a bypass from the source A to the XC node B as $$S_{AB} = \sum_{C:H_{BC} \leq H_{AC}-1} (H_{AC} - H_{BC} - 1)E_s(R_{AC}) + (H_{AB} - 1)E_s(R_{AB})$$

The second term of the first energy reduction metric reveals an immediate observation. If the traffic demand from a source to a specific cross connect is higher than the capacity of the wavelength, then a bypass should be created from the source to that specific cross connect.

Hence, the normalized traffic demand is d, i.e., the traffic demand divided by the line rate of optical link. The largest integer that is smaller than d can be obtained with a floor operator, and floor(d) signifies the minimum number of wavelength channel that are used in a bypass directly from a source to a destination. Because floor(d) amount of traffic is accounted for in this procedure, the procedure considers the remaining traffic, which we call fractional demand. The fractional demand can be determined by subtracting the floor from the original demand. That is, the fractional demand is d−floor(d). Furthermore, when a node is immediately adjacent to a source, no energy reduction can be achieved using a bypass.

To determine the optimal bypass for the fractional demand, we determine a first energy reduction metric $S_{AB}$ for all node pairs. If the energy demand for sending traffic of the sum of the fractional demand that leads to reduction is higher than capacity of a wavelength, then the bypass first takes traffic that achieves the greater reduction. Afterwards, remaining demand and capacity are considered so to reduce the amount of waste if a wavelength is not filled completely, or if the demand needs to be partitioned over multiple routes.

So far, the embodiments only describe a single source bypass. The concept can be generalized for a single destination bypass. The single source bypass first creates the bypass to a node, then the traffic is partitioned and transmitted to multiple destinations. For the single destination bypass, multiple sources first merge traffic at a node, and then a bypass is created from the node to the destination. The second energy reduction metric for single destination bypass is $$S_{BC} = \sum_{A:H_{AB} \leq H_{AC}-1} (H_{AC} - H_{AB} - 1)E_s(R_{AC}) + (H_{BC} - 1)E_s(R_{BC}).$$

When the network has multiple source nodes and multiple destination nodes, steps can be taken to concurrently consider both the single source bypass and the single destination bypass. The effective demand matrix is updated after each bypass is created.

In both energy reduction metrics, a bypass is either created from node A to node B, or from node B to node C. Hence, we say that both energy saving metrics $S_{AB}$ and $S_{BC}$ considers energy saving for creating a bypass that terminates at node B.

Up to now, the description has node A as the source node, and node C as destination node. In a real optical network, many source and destination nodes are present. Hence, the traffic demand for each source and destination pair are considered.

Also, in a large network, a cross connect that acts as a source or destination in one link can also serve as an intermediate cross connect node for another. For example, in a first link, traffic goes from New York City to San Francisco via Chicago, and in a second link, traffic goes from Chicago to Miami. The cross connect at Chicago is a source for the second link, and it is also an intermediate cross connect that serves traffic in the first link. Hence, all cross connect can also be a source or a destination in for a traffic demand.

Figure 4:
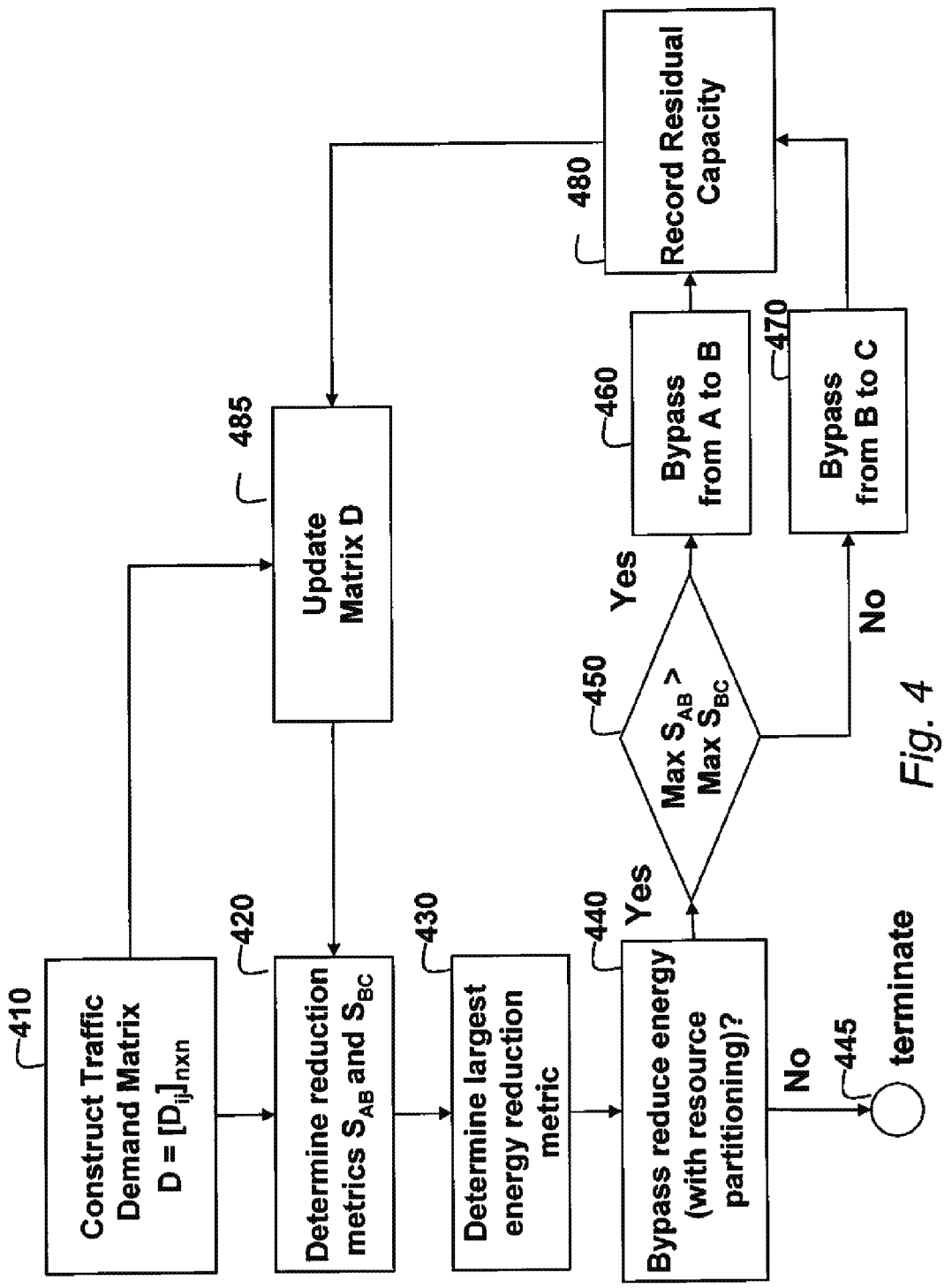
FIG. 4 is a flow diagram of a method creating bypasses according to embodiments of the invention.

FIG. 4 shows a method for creating bypasses in an optical network according to embodiments of the invention. The steps of the method, and any other processes described herein can be performed in a processor connected a memory and input/output interfaces as known in the art.

First, we construct 410 a traffic demand matrix D for each source-destination combination pairs. Source and destination can be cross connected, connected to an edge router, access router, or core router. If there are n sources and n destinations, the traffic demand matrix is an n×n matrix. The matrix is Matrix $D=[D_{i,j}]_{n \times n}$ where $D_{i,j}$ is the fractional demand between the source node i and the destination j pair.

To determine the fractional demand, the traffic demand between each pair of nodes node i and node j is normalized to a line rate R of the optical link between the nodes, and a floor operation is used to obtain the fractional demand. For example, if the traffic demand between node 2 and 5 is 25 Gbps, and the link rate is 10 Gbps, then, a normalized demand is 25 Gbps/10 Gbps=2.5. Then, we apply a floor operator to 2.5 to the normalized the traffic demands to obtain the fractional demand, i.e., the fraction demand between nodes 2 and 5 is $D_{2,5}$=2.5−floor(2.5)=2.5−2=0.5.

We determine 420 both the first energy reduction metric $S_{AB}$ and the second energy reduction metrics $S_{BC}$, where node A is the source, and node C is the destination, and B is any other node in the network, such as a cross connect.

We determine 430 the node B that yields the largest energy reduction amongst all possible nodes A and C. That is, $$B = \operatorname*{argmax}_{b}\left(\max_{A,C}(S_{Ab}, S_{bC})\right),$$

where the function arg max returns an index that has a maximum value.

Sometimes a wavelength can have higher capacity than the demand. In this case, we consider the energy loss due to waste of bandwidth, and compare the energy loss with the energy consumption of not having the bypass. Because the energy reduction of the bypass is very high, the bypass is created even though the demand does not take the whole capacity of the bypass. The residual capacity can be used by other traffic.

Sometimes the reduction metric with the higher value cannot be the best choice. This is because the use of the bypass requires partitioning resources, which then uses smaller ODU sizes at a higher marginal energy illuminated for the remaining traffic.

Hence, the system verifies 440 whether creation of bypass to node B would indeed reduce energy consumption given the issue of partitioning resources, and only creating the bypass if energy is reduced, other wise terminate 445.

Otherwise, we determine 450 whether the single-source bypass or the single-destination bypass has a larger energy reduction, and create the bypass 460 from node A to node B, or the bypass 470 from node B to node C, accordingly.

We record 480 any residual capacity, and update 485 the traffic demand matrix accordingly, and repeat at step 420.

Sometimes the demand is not known exactly. If a probability distribution function for the demand is known, then we consider the energy reduction metric so that energy reduction is assured Y % of time. For example, if Y=50, then a median value is used.

Routing Non-Bypass Traffic

The embodiments of the invention generate a novel spanning tree to determine optimal energy efficient routes through the optical network. Conventionally, a spanning tree process considers links that have fixed illuminated.

In our process, links have variable illuminates corresponding to the energy and demand. The illuminated of a link changes depending on the nodes that are connected in a specific branch of a tree. A branch with nodes with higher demand has links with a lower illuminated.

Figure 5:
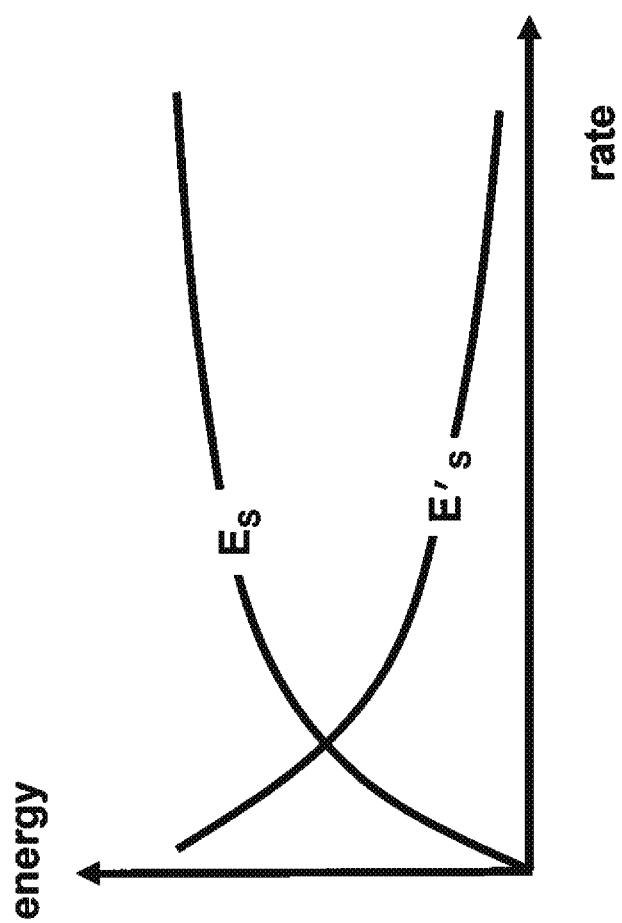
FIG. 5 is a graph of energy and the derivative of the energy as a function of data rate.

As shown in FIG. 5, the switching energy $E_S$ is a concave function of the rate R. This implies that the derivative $E'_s$ of the switching energy function is a decreasing function of the line rate R.

Figure 8:
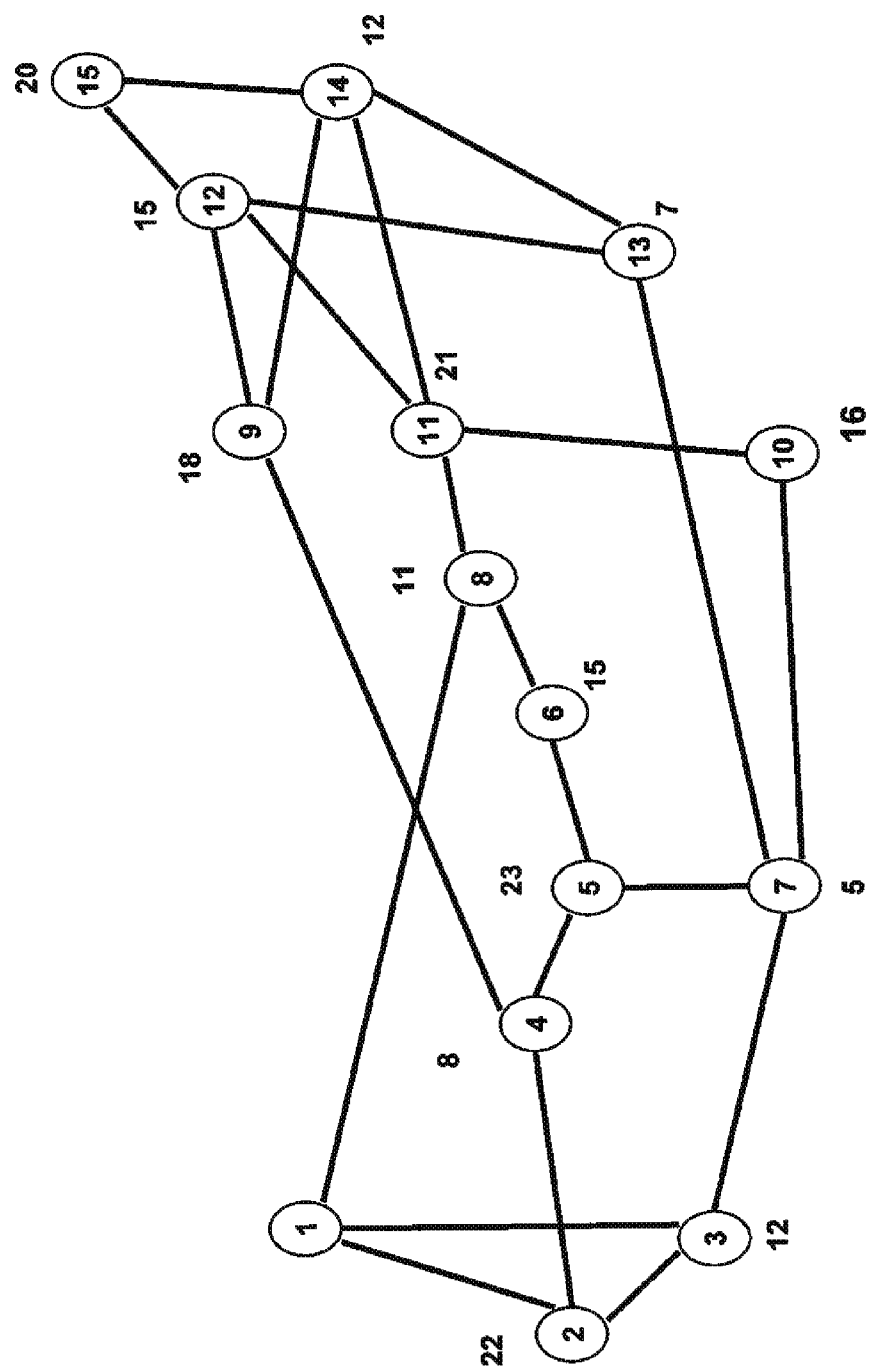
FIG. 8 is a schematic of an optical network corresponding to the spanning tree of FIG. 7.

Consider a single source case with source node 1 as an example, with network topology and traffic demand shown in FIG. 8. We normalize the traffic demand to be multiple of ODU0.

Figure 6:
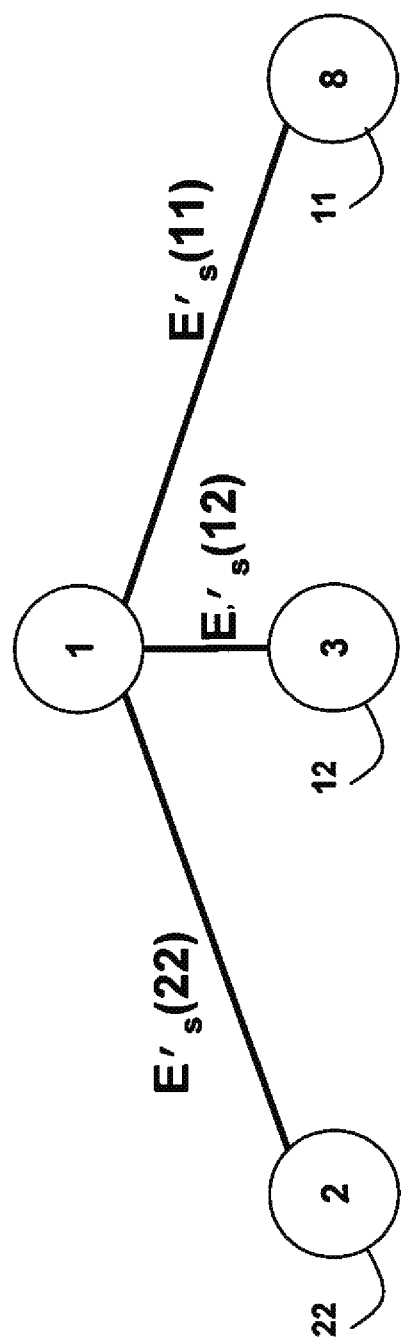
FIGS. 6-7 are spanning tree constructed according to embodiments of the invention.
Figure 7:
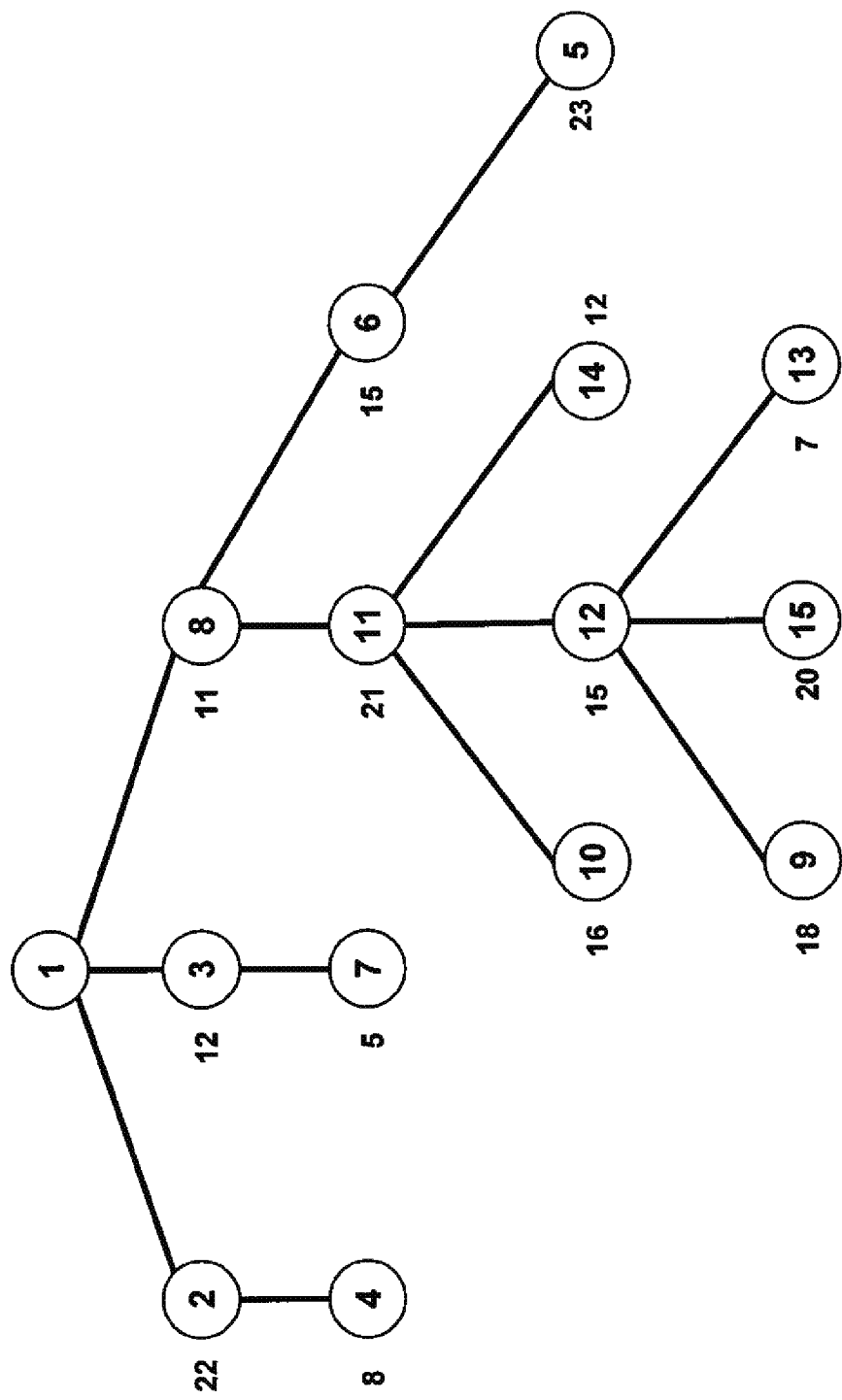

As shown in FIG. 6, the process for generating the spanning tree is as follows. FIG. 6 shows the initial spanning tree. FIG. 7 shows the complete spanning tree for the network shown in FIG. 8 with fifteen nodes.

The source node 1 is the root of a spanning tree.

First, all one-hop neighboring nodes of the root (source node 1) I are added to the tree at different branches in an increasing order of the illuminates. For this example, node 2 has 22 units of traffic, node 3 has 12 units of traffic, and node 4 has 11 units of traffic.

The branch between nodes 1 and 2 has a illuminated $E'_s$(22), the branch between nodes 1 and 3 has a illuminated $E'_s$(12), and the branch between nodes 1 and 3 has a illuminated $E'_s$(11). Because $E'_s$ is a decreasing function, $E'_s$(22) is the smallest.

Let $E_s(x)=2\sqrt{x}$ for example, then $$E'_s(x) = \frac{1}{\sqrt{x}}.$$

Hence, branch 1→2 has a illuminated $$\frac{1}{\sqrt{22}} = 0.2132;$$

branch 1→3 has illuminated $$\frac{1}{\sqrt{12}} = 0.2887,$$

and branch 1→8 has illuminated $$\frac{1}{\sqrt{11}}.$$

Because branch 1→2 has the least illuminated, we add node 2 to the branch. Now, between nodes 1 and 4, there are 8 units of traffic. After node 4 is added to branch from 1→2, all the link illuminates are updated.

From 1→2, the link needs to serve 22+8=30 units of traffic, which corresponds to a illuminated of $$\frac{1}{\sqrt{30}} = 0.1826.$$

From 2→4, there are only 8 units of traffic, which corresponds to a illuminated of 0.3536.

The process is repeated to identify the branch of the least marginal illuminated. In this example, it is branch 1→3. The marginal illuminated is the derivative of the total illuminated.

After node 7 is added to branch 1→3, the illuminated is updated between 1→3 and 3→7.

Now the branch 1→8 has the least illuminated.

Because node 8 has multiple neighbors, multiple nodes can be branched out from node 8.

The link illuminated between 1→8 decreases every time a node is added below that branch. With the addition of nodes 11 and 6, the total traffic going from node 1 to 8 is now 11+15+21=47 units, which has a marginal illuminated of 0.1459.

The process is repeated. Sometimes the branch with the lowest illuminated has no new neighbor. Hence, we only add the node to the lowest illuminated branches with neighbors.

For multiple-source multiple-destination, the process is analogous to the single-source case. However, instead of constructing the spanning tree with a single root, a web is created. The process starts with the overall demand matrix, and start with one-hop neighbors like the single source case. Each time a link is added, a marginal illuminated between two nodes can be determined. During each iteration, we consider an end-to-end route that has the least marginal energy consumption given what has already been allocated over the link. Each time an end-to-end route is added to the web, the marginal illuminated of links included in the end-to-end route decrease. This process can be repeated until all demands are considered.

Link capacity is also considered. The process ensures that the aggregate demand across a specific link is not higher than its maximum capacity. When capacity is reached, the link is removed from the graph.

Signaling for Energy Efficient Optical Route

Under the Generalized Multi-Protocol Label Switching (GMPLS) framework (RFC 3945, October 2004, Mannie), User Network Interface (UNI) and Network-Network Interface (NNI) are used to communicate between different autonomous networks.

The UNI allows users in access networks to request bandwidth and class of service for connection, as well as network restoration and protection requirements. With energy efficient optical route, environmentally conscious users can specify routes to be set up in energy efficient manner even though the route cannot be delay optimal. Network operator can also provide pricing incentive for users who prefer energy efficient routes, as energy efficient routes lower the operating expense for network operator.

The NNI advertises network resources that are available in adjacent network. Energy efficient route can be advertised to neighbors, which then can be reported to the network users for creation of overall energy efficient routes across multiple autonomous networks.

A wavelength bypass through autonomous networks can also be created by appropriate signaling through NNI. For example, a network provider X can create a bypass between an edge router A and node B, both in its network. Further, assume that the network provider has connection to two other network providers Y and Z, so that the edge router A is connected to another edge router from network provider Y, and the edge router B is connected to another edge router from network provider Z. In this case, network provider X can promote an optical bypass link at a certain wavelength and port using NNI that allow network provider Y to send traffic directly to network provider Z. This method allows energy reduction across multiple autonomous networks.

If network B has sufficient traffic to transmit to network C, connection between network A and B can be changed so that traffic no longer need to pass through the edge router. Rather, an optical bypass is directly created from network B to network C.

Different networks can have different switching energy illuminated. Vendors of network equipment provide appropriate functions that describe energy consumption as a function of data rate for their specific equipments. That is, both the switching energy function $E_s$ and its derivative $E'_s$ are required. If such information is not provided, then it is possible to measure such a function and make it available to network management and route design software.

Extension to Layer-3 Routing

Currently, routing functions are done in the networking layer using the Internet Protocol (IP). Routing tables are exchanged to discover network resources. However, only the hop count is used to determine the "shortest" path from a source to a destination, such as used in Open Shortest Path First (OSPF) IP protocol.

It is important to note that the adjacent neighbors in layer-3 (L3) routers are determined by the route configuration in the underlying optical network. Because energy consumption of optical network changes depending on the use of the bypass, as well as the demand of traffic through each of its fiber links, the optical network can provide an additional energy illuminated function that depends on the current utility of links to routers. When such information is integrated into an L3 router, further overall energy reduction can be obtained across the entire communications networks.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for creating a bypass in an optical network including a plurality of source nodes, a plurality of cross connect nodes (XCs) and a plurality of destination nodes, comprising the steps of:

constructing a traffic demand matrix for each possible pair of combinations of the source nodes and the destination nodes, wherein the traffic demand matrix is constructed from fractional demands between each pair of the nodes and wherein, each traffic demand between each pair of nodes is normalized to a line rate R of an optical link between the pair of nodes;

applying a floor operation to each normalized traffic demand to obtain the fractional demands;

determining a first energy reduction metric for creating the bypass between the source node and any XC node based on the traffic demand matrix;

determining a second energy reduction metric for creating the bypass between any XC node and the destination node using the traffic demand matrix; and creating a bypass that terminates at one of the XC nodes that has a largest energy reduction metric, wherein the steps are performed in a processor.

2. The method of claim 1 wherein data traffic in the optical network is transmitted in optical data units, and data traffic passing through the bypass uses an entire wavelength.

3. The method of claim 1, wherein a minimum hop distance between the bypass to a particular node is smaller than a minimum hop distance from the source node to the destination node.

4. The method of claim 1, further comprising:

updating the traffic demand matrix, and repeating the determining and replacing steps.

5. The method of claim 4, further comprising:

determining if the bypass reduces energy when partitioning of resources is required, and only replacing the XC node if the bypass reduces the energy, and otherwise terminate.

6. The method of claim 1, further comprising:

generating a spanning tree to determine optimal energy efficient routes through the optical network.

7. The method of claim 6, wherein the source node is represented by a root of the spanning tree, and links between the nodes are represented by branches in the spanning tree, and wherein a marginal illuminated associated with each link corresponds to a varying traffic demand between a pair of nodes connected by the branch.

8. The method of claim 7, further comprising:

adding all one-hop neighboring nodes of the source node to the tree at different branches in all increasing order of the marginal illuminated.

9. The method of claim 1, further comprising:

advertising the bypass that achieves energy reduction in Network-Network Interface in Generalized Multi-Protocol Label Switching.

10. The method of claim 1, further comprising:

providing an energy illuminated function to be used in layer-3 router.

* * * * *